United States Patent
Jennings et al.

(10) Patent No.: US 8,984,119 B2
(45) Date of Patent: Mar. 17, 2015

(54) CHANGING AN EVENT IDENTIFIER OF A TRANSIENT EVENT IN AN EVENT NOTIFICATION SYSTEM

(75) Inventors: Cheryl L. Jennings, Austin, TX (US); Rajeev Mishra, Bangalore (IN); Trishali Nayar, Pune (IN); Lance W. Russell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 12/940,137

(22) Filed: Nov. 5, 2010

(65) Prior Publication Data

US 2012/0117223 A1 May 10, 2012

(51) Int. Cl.
*G06F 15/173* (2006.01)
*G06F 9/54* (2006.01)

(52) U.S. Cl.
CPC ...................................... *G06F 9/542* (2013.01)
USPC .............................. 709/224; 709/206; 719/318

(58) Field of Classification Search
USPC ........................................................ 709/224
See application file for complete search history.

(56) References Cited

U.S. PATENT DOCUMENTS

| | | | |
|---|---|---|---|
| 6,038,563 A | 3/2000 | Bapat et al. | |
| 6,064,656 A | 5/2000 | Angal et al. | |
| 6,185,613 B1 | 2/2001 | Lawson et al. | |
| 6,411,967 B1 | 6/2002 | Van Renesse | |
| 6,591,317 B1 | 7/2003 | Schzukin et al. | |
| 6,631,363 B1 | 10/2003 | Brown et al. | |
| 6,778,504 B2 | 8/2004 | Santry et al. | |
| 6,862,619 B1 | 3/2005 | Sugauchi et al. | |
| 6,983,324 B1 | 1/2006 | Block et al. | |
| 7,058,957 B1 | 6/2006 | Nguyen | |
| 7,542,437 B1 | 6/2009 | Redi et al. | |
| 7,571,230 B2 | 8/2009 | Gissel et al. | |
| 7,650,404 B2 | 1/2010 | Parupudi et al. | |
| 7,664,125 B1 | 2/2010 | Bauer et al. | |
| 7,856,480 B2 | 12/2010 | Muchow | |
| 7,913,105 B1 | 3/2011 | Ganesh et al. | |
| 8,108,715 B1 | 1/2012 | Agarwal | |
| 8,161,053 B1 | 4/2012 | Khan et al. | |
| 8,384,549 B2 | 2/2013 | Lemmon | |
| 8,433,760 B2 | 4/2013 | Ganapathy et al. | |
| 8,484,472 B2 | 7/2013 | Sherkin et al. | |
| 8,634,330 B2 | 1/2014 | Ganapathy et al. | |
| 2002/0178275 A1 | 11/2002 | Hein et al. | |
| 2003/0061340 A1 | 3/2003 | Sun et al. | |
| 2003/0088831 A1 | 5/2003 | Bauer et al. | |
| 2003/0093516 A1 | 5/2003 | Parsons et al. | |
| 2003/0105801 A1* | 6/2003 | Tse et al. | 709/202 |

(Continued)

*Primary Examiner* — Viet Vu
*Assistant Examiner* — Herman Belcher
(74) *Attorney, Agent, or Firm* — Mitch Harris, Atty at Law, LLC; Andrew M. Harris; Parashos T. Kalaitzis

(57) ABSTRACT

An event notification system for distributed processing systems provides for replacement of event identifiers associated with transient objects, such as processes within the processing system. An event management interface receives a notification from an event producer that an identifier of an event produced by the event producer is no longer valid. The event management interface blocks event notification for the event and dissociates an event registration entry associated with the event from the event identifier. A new event identifier is received from the event producer by the event management interface, which associates the registration entry with the new event identifier. Event notification for the event is then resumed.

20 Claims, 4 Drawing Sheets

(56) References Cited

U.S. PATENT DOCUMENTS

| | | |
|---|---|---|
| 2003/0225840 A1* | 12/2003 | Glassco et al. ............... 709/206 |
| 2003/0233594 A1 | 12/2003 | Earl |
| 2004/0008727 A1 | 1/2004 | See et al. |
| 2004/0030775 A1 | 2/2004 | Lauzon et al. |
| 2004/0064835 A1 | 4/2004 | Bellwood et al. |
| 2004/0172467 A1 | 9/2004 | Wechter et al. |
| 2005/0065953 A1 | 3/2005 | Bower et al. |
| 2005/0076145 A1 | 4/2005 | Ben-Zvi et al. |
| 2005/0152396 A1 | 7/2005 | Pichna et al. |
| 2005/0234929 A1 | 10/2005 | Ionescu et al. |
| 2006/0031282 A1 | 2/2006 | Tuttle et al. |
| 2006/0050629 A1 | 3/2006 | Saika |
| 2007/0041328 A1 | 2/2007 | Bell, IV |
| 2007/0074066 A1 | 3/2007 | Potter et al. |
| 2007/0140243 A1 | 6/2007 | Eastham |
| 2007/0156884 A1 | 7/2007 | Potter et al. |
| 2007/0156922 A1 | 7/2007 | Potter et al. |
| 2007/0226182 A1 | 9/2007 | Sobotka et al. |
| 2007/0282959 A1 | 12/2007 | Stern |
| 2008/0008106 A1 | 1/2008 | Boberg et al. |
| 2008/0077635 A1 | 3/2008 | Sporny et al. |
| 2008/0183857 A1 | 7/2008 | Barfield et al. |
| 2008/0317050 A1 | 12/2008 | Xiong et al. |
| 2009/0043887 A1 | 2/2009 | Coekaerts |
| 2009/0083156 A1* | 3/2009 | Cotten et al. ............... 705/14 |
| 2009/0138808 A1 | 5/2009 | Moromisato et al. |
| 2009/0199051 A1* | 8/2009 | Jann et al. ............... 714/57 |
| 2010/0077310 A1 | 3/2010 | Karachale et al. |
| 2010/0094922 A1 | 4/2010 | Sathish |
| 2010/0099447 A1 | 4/2010 | Boberg et al. |
| 2010/0113072 A1 | 5/2010 | Gibson et al. |
| 2010/0138728 A1 | 6/2010 | Kim et al. |
| 2010/0153528 A1 | 6/2010 | Pearson et al. |
| 2010/0223492 A1 | 9/2010 | Farrugia et al. |
| 2010/0274885 A1 | 10/2010 | Yoo et al. |
| 2010/0281304 A1 | 11/2010 | Moyer et al. |
| 2010/0290469 A1 | 11/2010 | Assarpour |
| 2010/0332277 A1* | 12/2010 | Dentzer et al. ............... 705/8 |
| 2011/0035462 A1 | 2/2011 | Akella |
| 2011/0041140 A1 | 2/2011 | Harm et al. |
| 2011/0093743 A1 | 4/2011 | Arcese et al. |
| 2011/0145639 A1 | 6/2011 | Farahmand et al. |
| 2011/0202500 A1 | 8/2011 | Warn et al. |
| 2011/0274053 A1 | 11/2011 | Baik et al. |
| 2012/0036250 A1 | 2/2012 | Vaswani et al. |
| 2012/0047257 A1 | 2/2012 | Hauser |
| 2012/0144018 A1 | 6/2012 | Fried et al. |
| 2012/0203897 A1 | 8/2012 | Mishra et al. |
| 2012/0203899 A1 | 8/2012 | Ganapathy et al. |
| 2013/0042001 A1 | 2/2013 | Gould et al. |

* cited by examiner

CHANGING AN EVENT IDENTIFIER OF A TRANSIENT EVENT IN AN EVENT NOTIFICATION SYSTEM

BACKGROUND

1. Field of the Invention

The present invention is related to handling of event notification in computer systems, and more specifically to changing of event identifiers for transient events so that registration of a new event is not required.

2. Description of Related Art

In large-scale distributed computer systems, such as those using distributed software models to perform tasks, multiple nodes provide independent execution of sub-tasks. In order to keep such a system operational, and further, to provide indication of events occurring at one node that either require a reaction from another node or indicate to the other node that either an erroneous operating condition has occurred, or that a phase of processing is complete. In particular, event notification and event logging are operations used to indicate system health to system administrators or software applications, including operating systems components.

Health monitoring techniques employed in distributed processing systems perform an important function in that connections to other nodes must be reliable and all of the active nodes that have been assigned tasks need to perform those tasks in order to ensure that the totality of the processing requirements are met, and in a timely fashion. The health of a node-based distributed processing system is typically monitored by: 1) a heartbeat messaging system, which passes messages between the nodes and a central monitoring component; and 2) an event notification system that signals interested nodes when events occur on other nodes. Event notification systems in node-based distributed processing systems typically require an interested application (a consumer) to register to receive event notifications either with a centralized event manager, or with the processes or objects that generate the events (an event producer).

BRIEF SUMMARY

The invention provides an event notification system and method that is embodied in a computer-performed method, a computer program product and computer systems. The method, which is implemented by the computer program product and computer system, provides for changing the event identifier when something causes the existing event identifier to become invalid.

An event management interface receives a notification from an event producer that an identifier of an event produced by the event producer is no longer valid. The event management interface blocks event notification for the event and dissociates an event registration entry associated with the event from the event identifier. A new event identifier is received from the event producer by the event management interface, which associates the registration entry with the new event identifier. Event notification for the event is then resumed.

The event management interface may provide a cookie to the event producer in response to receiving the notification, which may be a pointer or an index into an event registration data structure, and which is then returned with the new event identifier so that the new event identifier can be properly associated with the event registration entry. The event management interface may be implemented as a mountable file system in which file (or device) open, read and write requests are received from event consumers and interpreted as event registrations by the file system implementation, providing a facile and portable mechanism for providing event notifications between nodes in a distributed processing system. The files within this file system represent events that event consumers may monitor.

The foregoing and other objectives, features, and advantages of the invention will be apparent from the following, more particular, description of the preferred embodiments of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION

The present invention encompasses techniques for event notification in clusters of nodes within distributed computing systems. In particular, embodiments of the invention provide for changing the identifier of an event for which event consumers have registered, without requiring the event consumers to register to receive notifications associated with a new event identifier and optionally without notifying the event consumers at all. Transient objects with which an event identifier is associated, for example a process for which the process identifier (PID) is used as an event identifier, typically require that event handling for the event identifier be terminated when the object is destroyed and/or the event identifier becomes invalid. Event consumers are then required to re-register for a new event when the process or other object is re-generated. The present invention provides a mechanism that can be transparent to the event consumers, so that when a transient object is replaced, the event registration(s) associated with that event can be updated to connect the event consumers with the new event/object via a new event identifier.

Figure 1:
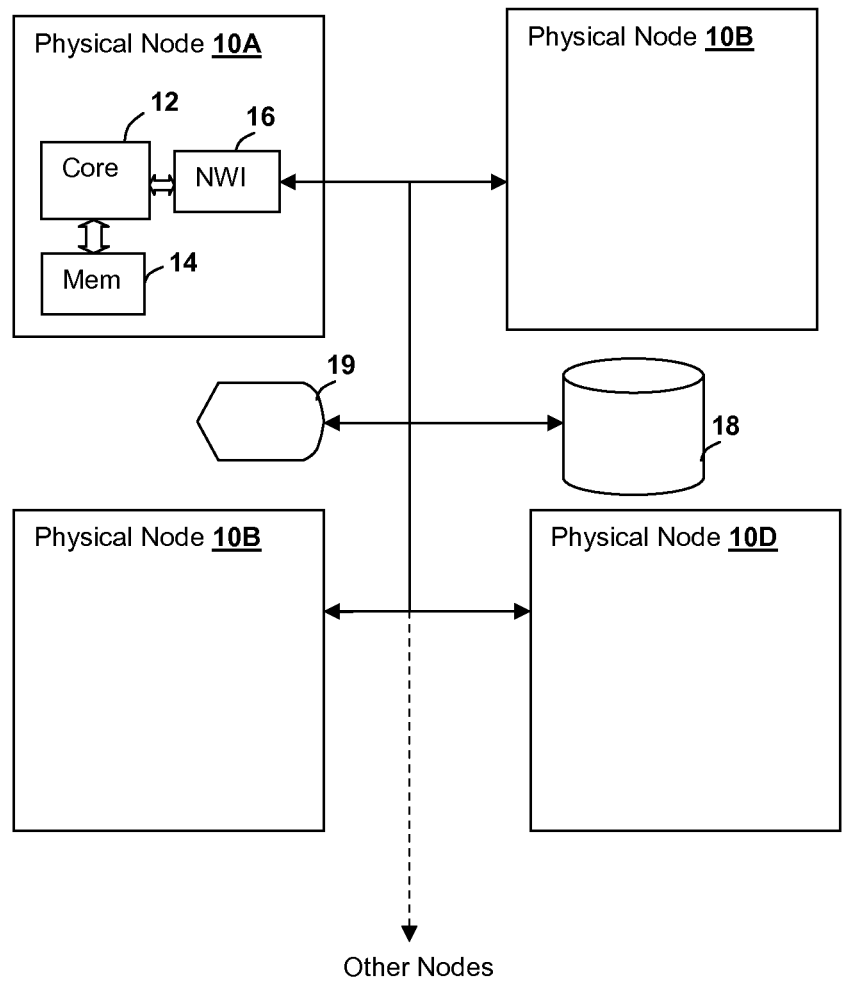
FIG. 1 is a block diagram of a distributed computer system in which techniques according to an embodiment of the present invention are practiced.

Referring now to FIG. 1, a distributed computer system in accordance with an embodiment of the present invention is shown. A first physical processing node 10A includes a processor core 12 coupled to a memory 14 that stores program instructions for execution by processor 12. The program instructions include program instructions forming computer program products in accordance with embodiments of the invention that provide event notification between either physical processing nodes 10A-10D, virtual processing nodes partitioned within the depicted computer system as will be described in further detail below, or both. Processing node 10A also includes a network interface (NWI) 16 that couples processing node 10A to a wired, wireless or hybrid network, which may be a standardized network such as Ethernet, or a proprietary network or interconnect bus. Other processing nodes 10B-10D are of identical construction in the exemplary embodiment, but embodiments of the invention may be practiced in asymmetric distributed systems having nodes with differing features. Although only four compute nodes 10A-10D are illustrated, a distributed computer system in accordance with an embodiment of the present invention will generally include a large number of compute nodes connected via one or more networks. The distributed computer system of FIG. 1 also includes other resources such as I/O devices 19, including graphical display devices, printers, scanners, keyboards, mice, which may be coupled to the network or one of nodes 10A-10D via workstation computers that provide a user interface to administrative personnel and other users. Nodes 10A-10D are also coupled to storage devices 18, for storing and retrieving data and program instructions, such as storing computer program products in accordance with an embodiment of the invention.

Figure 2:
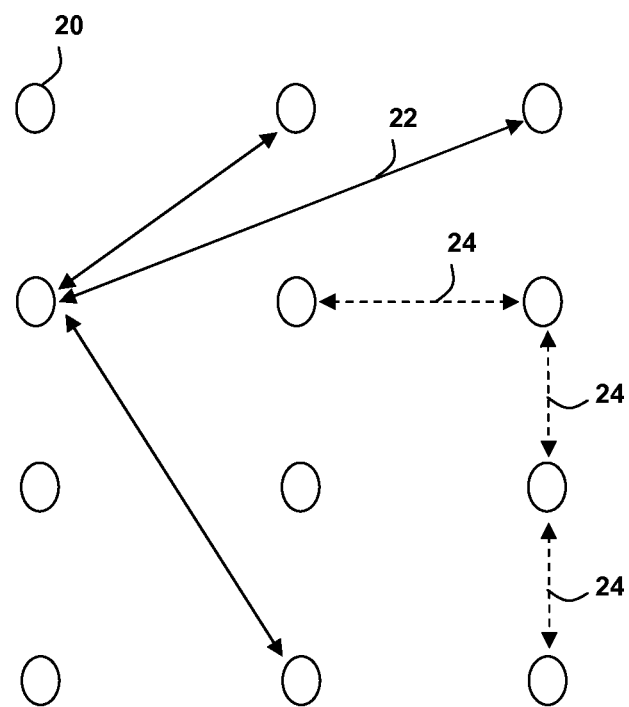
FIG. 2 is a pictorial diagram depicting communication between nodes of a computer system in accordance with an embodiment of the present invention.

Referring now to FIG. 2, communication between multiple nodes 20 of the distributed computer system of FIG. 1 is shown. As mentioned above, nodes 20 may correspond exactly on a one-to-one basis with processing nodes 10A-10D (and other nodes) of FIG. 1, or nodes 20 may be partitioned in a different manner as virtual processing nodes. For example, a single node 20 may have exclusive use of multiple processing nodes, e.g. nodes 10A-10B, and result in a system having a greater number of virtual nodes than processing nodes, or alternatively, multiple nodes 20 may be implemented on a single processing node, e.g., node 10A. In the present invention, each of nodes 20 represents at least one operating system image and one or more applications executing within the operating system image. In general, the entire system as depicted may execute a single application, but sub-tasks within the application are apportioned to the various nodes 20, which may be identical sub-tasks or different sub-tasks. The present invention concerns event notification within the computer system of FIG. 1, in which events are communicated between nodes 20 via event notification messages. Other messages are also passed between nodes 20, including data and program code transmissions, and messages as needed to support features of embodiments of the present invention, such as indications to remote nodes that event notifications of a particular event type are of interest to another node. A separate physical network may be provided for administrative tasks such as event notification and heartbeat messaging, or the same physical networks may be used. Nodes are generally arranged in a cluster, which is a group of virtual or physical processing nodes organized to perform a particular task or group of tasks, e.g., for a particular customer. As illustrated, communication between nodes in a cluster may be accomplished by direct node to node communications 22 or by next-neighbor communications 24 in which nodes 20 pass along messages to other nodes 20. Another alternative is to use a central facility for inter-node communication. However, since the illustrated embodiment provides a high availability event notification system having low latency, it is generally preferable not to use a central clearinghouse for events and other messages.

While event notification in accordance with embodiments of the present invention may be implemented using a variety of event notification mechanisms, such as direct object-to-object interfaces, using operating system-maintained signaling object such as semaphores, in the depicted embodiment, the event notification is provided by a special file system that implements an event manager. Event consumers, i.e., the applications or objects interested in receiving event notifications, register to receive event notifications by calling file operation functions/methods on an interface to the file system. Event producers notify the file system of events via a separate application programming interface (API) provided by the event manager. The event manager then provides the event notifications to the event consumers interested in the particular events represented by the event notifications. In the depicted embodiment, the file system is a kernel extension, which facilitates availability and uniformity of the event manager at each node in the system. Further details of a file-system based event manager are provided in U.S. Patent Application Publication U.S. 200901991051, which is incorporated herein by reference. The event notification system the "Autonomic Health Advisor File System" (AHAFS) disclosed in the above-incorporated U.S. Patent Application does not provide direct event notification between the nodes, so a separate layer is used for inter-node event communication. The generic methods open( ) and write( ) described below are understood to include specific file operations fopen( ) and fwrite( ) as alternatives, or other operations provided in a file system interface that can be used to provide the same type of information flow.

Figure 3:
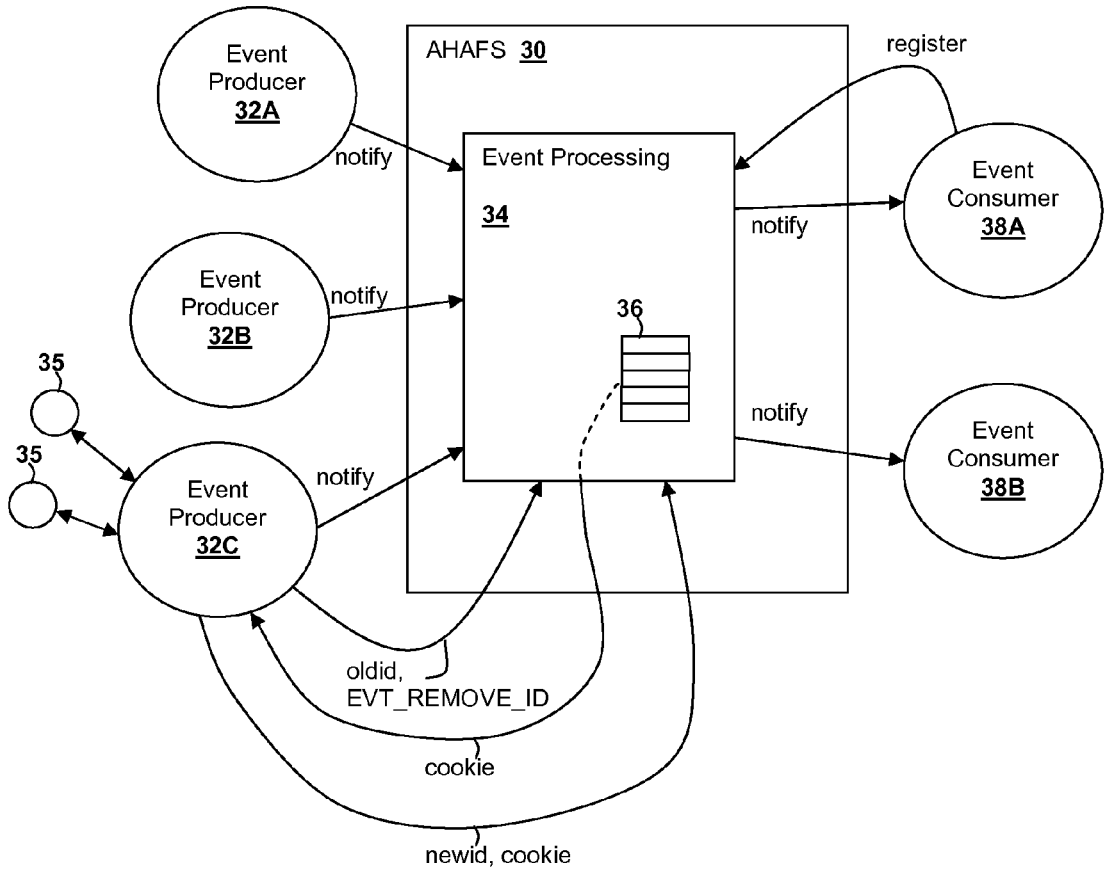
FIG. 3 is a pictorial diagram depicting event notification and event registration in a computer system in accordance with an embodiment of the present invention.

Referring now to FIG. 3, information flow within an event notification system according to an embodiment of the invention is shown. Event producers 32A-32C generate event notifications that are provided to an event processing block 34 within an AHAFS software component 30, which is generally distributed among nodes 20. Instances of an AHAFS interface on each node 20 receive event notifications from event producers 32A-32C and either queue them for local consumption or transmit them for remote consumption. AHAFS software component 30 also receives remote event notifications from remote instances of AHAFS interfaces. Both local events and remote event notifications are delivered by AHAFS software component 30 to event consumers 38A-38B, which process the events and perform any responsive actions. Event processing block 34 contains an event registration table 36 or other data structure that connects identifiers of events produced by event producers 32A-32C with event consumers 38A-38B for event identifiers for which event consumers 38A-38B have registered. In the exemplary embodiment, registration table 36 contains pointers, handles or other specifier to files created and opened by event consumers 38A-38B that correspond to events. When an event producer, e.g., event producer 32C determines that an event identifier will no longer be valid, then event producer provides a message through the event notification callback function provided by AHAFS software component 30 that indicates to event processing block 34 that the event identifier is no longer valid. For example, event producer 32C may manage the spawning of processes 35 to handle tasks, and if the system terminates one of processes 35 for any reason, event producer 32C will be informed via a callback. It may be convenient, when associating a process with an event, e.g., an event signaling completion of a task assigned to one of processes 35 to use the process identifier (PID) of the process as an event identifier. If the PID is used as the event identifier and the process is terminated, when a replacement process is spawned, the event identifier will be incorrect. The typical manner of handling such an occurrence is to notify any of event consumers 38A-38B registered to receive notifications of the event to un-register the event (or to automatically un-register the consumers and notify those consumers). The present invention replaces the event identifier without involving the event consumers by a process that will be described in further detail below.

As an example, when event producer 32C determines that the PID of one of processes 35 is no longer valid, event producer generates a message that indicates to event processing block 34 that the event identifier is no longer valid and provides the message to the event notification callback function. In one exemplary embodiment, a flags field within the data structure used to provide an event notification includes a flag AHAFS_EVENT_REMOVE_ID, along with the other information that identifies the particular event. Event processing block 34 detects the AHAFS_EVENT_REMOVE_ID flag and blocks processing of events having the event identifier specified in the message data structure. Event processing block 34 then returns a cookie, which may be an index or pointer to an entry in event registration table 36 that in the exemplary embodiment contains a file handle, pointer, or other specifier of the file representing the particular event. Once the new event identifier is available to event producer 32C, event producer 32C again calls the event notification callback function, providing the cookie and with a flag AHAFS_EVENT_UPDATE_ID set in the data structure. When event processing block 34 receives the cookie, the corresponding event registrations are updated in event registration table 36.

If it is desirable to notify event consumers 38A-38B that a change in event identifiers is taking place, event producer 32C can provide an indication, such as another flag, to inform event processing block 34 that associated event consumers should be notified by completing their pending read with the event data provided by event producer 32C, which will generally indicate that the event identifier is being changed and the reason. Separate flags can be provided from event producer 32C that indicate whether the associated event consumers should be notified when the event identifier becomes invalid and/or when the new event identifier has been associated with the event. Since, in the exemplary embodiment, the files are virtual files represented by data structures in memory, each notification described above is understood to represent completion of a file read from event consumers that is performed by AHAFS software component 30 by waking threads that issued reads from the event consumers and that were suspended (slept) by AHAFS software component 30. Further details of the operation of the AHAFS software component 30 are provided in the above-incorporated published U.S. Patent Application. It is understood that the file-based event notification system described above and in the above-incorporated published U.S. Patent Application is only one exemplary embodiment of the present invention and that other non-file based event notification systems may use techniques in accordance with an embodiment of the present invention to manage transient object/event identifiers associated with event notifications.

Figure 4:
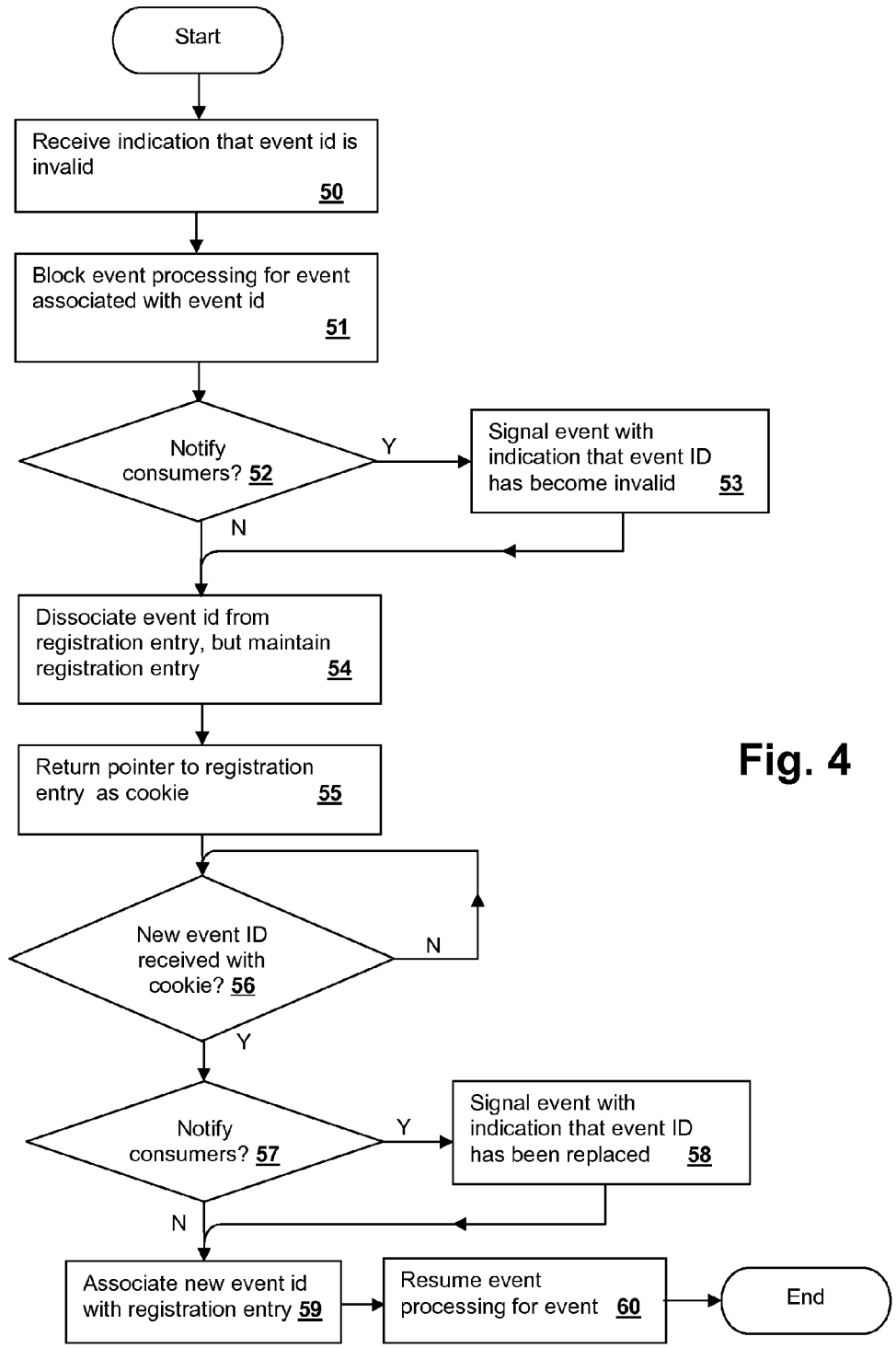
FIG. 4 is a flowchart of a method in accordance with an embodiment of the present invention.

Referring now to FIG. 4, a method in accordance with an embodiment of the invention is shown in a flowchart. When a notification is received from an event producer that an event identifier is invalid (step 50), event processing for the event is blocked (step 51). If the event producer indicates that event consumers should be notified at the point of invalidating the event identifier (decision 52), then the event is signaled with an indication that the event identifier has become invalid (step 53). The event identifier is dissociated from the corresponding event registration entry (entries), but the registration entry is maintained, which in the AHAFS example given above, means that the file corresponding to the registration is not deleted and the registration entry in the table is maintained but marked as in-transit/temporarily invalid (step 54). A cookie is returned to provide an index or pointer to the registration entry (step 55). When a new event identifier is received, along with the cookie (decision 56), if the event producer indicates that event consumers should be notified at the point of replacing the event identifier (decision 57), then the event is signaled with an indication that the event identifier has been replaced (step 58). The new event identifier is associated with the registration entry (step 59) and event processing is resumed for the event (step 60).

As noted above, the present invention may be embodied as a system, method, and/or a computer program product. A computer program product may be embodied in firmware, an image in system memory or another memory/cache, stored on a fixed or re-writable media such as an optical disc having computer-readable code stored thereon. Any combination of one or more computer readable medium(s) may be used to store the program instructions in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Further, while the illustrative embodiment is directed to an AIX (AIX is a trademark of IBM) or other type of UNIX operating system (UNIX is a trademark of The Open Group), in which the event notification is provided by a mountable file system provided as a kernel extension, it is understood that the techniques of the present invention can be applied in event monitoring systems executing under any operating system and can be implemented using proprietary or standardized signaling interfaces as an alternative to the file system interface provided in the depicted embodiments.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A method for operating an event notification system within a cluster of nodes of a computer system, the method comprising:
   from the event notification system, transmitting event notifications providing indications of an event occurring within the computer system, to one or more event consumers in response to event notifications received an event producer of the event and according to an event registration entry within the event notification system;
   first receiving, at an event management interface and from the event producer of the event, a notification that an event identifier associated with the event in the event registration entry is no longer valid;
   responsive to receiving the notification that the event identifier is no longer valid at the event management interface, blocking event notification for the event at the event management interface, whereby the transmitting of the event notifications to the event consumers is suspended;
   further responsive to receiving the notification that the event identifier is no longer valid at the event management interface, dissociating the event identifier from the event registration entry, while maintaining the event registration entry;
   second receiving, from the event producer, a new event identifier associated with the event;
   responsive to second receiving the new event identifier, associating the registration entry with the new event identifier; and
   responsive to associating the registration entry with the new event identifier, at the event management interface, resuming event notification for the event, whereby the transmitting of the event notifications to the event consumers is resumed.

2. The method of claim 1, wherein the event management interface, in response to the first receiving, performs the blocking and dissociating and returns a cookie associated with the event registration entry to the event producer, wherein the event producer further provides the cookie with the new event identifier, whereby the second receiving receives the cookie, and wherein the method further locates the registration entry using the cookie and performs the associating in conformity with a result of the locating.

3. The method of claim 1, wherein the event management interface is an interface of a file system that implements event notification in the computer system, wherein the event registration entry is a data structure providing a specifier of a file in the file system representing the event, and wherein the maintaining comprises retaining the file in the file system and the specifier in the data structure while the file is not associated with the event identifier.

4. The method of claim 3, wherein the dissociating writes an indication to the file that the event identifier has been dissociated, whereby an event consumer associated with the file is notified that the event identifier has been dissociated.

5. The method of claim 4, wherein the dissociating further writes an indication of a particular action taken by the producer that caused removal of the event identifier.

6. The method of claim 1, wherein the event is associated with a process, wherein the process is terminated causing the event identifier to become no longer valid, wherein a replacement process is spawned subsequent to termination of the process, and wherein the second receiving is performed responsive to spawning of the replacement process.

7. The method of claim 1, wherein the process has a first process identifier wherein the replacement process has a second process identifier, and wherein the event identifier is the first process identifier and the new event identifier is the second process identifier.

8. A computer system comprising a processing cluster including a plurality of physical or virtual processing nodes, the computer system comprising at least one processor for executing program instructions and at least one memory coupled to the processor for executing the program instructions, wherein the program instructions are program instructions for providing event notification within the computer system and implementing an event management interface, the program instructions comprising program instructions for:
   from an event notification system, transmitting event notifications providing indications of an event occurring within the computer system, to one or more event consumers in response to event notifications received an event producer of the event and according to an event registration entry within the event notification system;
   first receiving, at the event management interface and from the event producer of the event, a notification that an event identifier associated with the event in the event registration entry is no longer valid;
   responsive to receiving the notification that the event identifier is no longer valid at the event management interface, blocking event notification for the event at the event management interface, whereby the transmitting of the event notifications to the event consumers is suspended;
   further responsive to receiving the notification that the event identifier is no longer valid at the event management interface, dissociating the event identifier from the event registration entry, while maintaining the event registration entry;
   second receiving, from the event producer, a new event identifier associated with the event;
   responsive to second receiving the new event identifier, associating the registration entry with the new event identifier; and
   responsive to associating the registration entry with the new event identifier, at the event management interface, resuming event notification for the event, whereby the transmitting of the event notifications to the event consumers is resumed.

9. The computer system of claim 8, wherein the program instructions for implementing the event management interface, in response to the first receiving, perform the blocking and dissociating and return a cookie associated with the event registration entry to the event producer, wherein the event producer further provides the cookie with the new event identifier, whereby the program instructions for second receiving receive the cookie, and wherein the program instructions further comprise program instructions for locating the registration entry using the cookie and performing the associating in conformity with a result of the locating.

10. The computer system of claim 8, wherein the event management interface is an interface of a file system that implements event notification in the computer system, wherein the event registration entry is a data structure providing a specifier of a file in the file system representing the event, and wherein the program instructions for maintaining retain the file in the file system and the specifier in the data structure while the file is not associated with the event identifier.

11. The computer system of claim 10, wherein the program instructions for dissociating write an indication to the file that the event identifier has been dissociated, whereby an event consumer associated with the file is notified that the event identifier has been dissociated.

12. The computer system of claim 11, wherein the program instructions for dissociating further write an indication of a particular action taken by the producer that caused removal of the event identifier.

13. The computer system of claim 8, wherein the event is associated with a process, wherein the process is terminated causing the event identifier to become no longer valid, wherein a replacement process is spawned subsequent to termination of the process, and wherein the program instructions for second receiving receive the notification in response to spawning of the replacement process.

14. The computer system of claim 8, wherein the process has a first process identifier wherein the replacement process has a second process identifier, and wherein the event identifier is the first process identifier and the new event identifier is the second process identifier.

15. A computer program product comprising a computer-readable storage device storing program instructions for execution within a computer system, the computer system comprising a processing cluster including a plurality of physical or virtual processing nodes, wherein the program instructions are program instructions for providing event notification within the computer system and implementing an event management interface, the program instructions comprising program instructions for:
from the event notification system, transmitting event notifications providing indications of an event occurring within the computer system, to one or more event consumers in response to event notifications received an event producer of the event and according to an event registration entry within the event notification system;
first receiving, at the event management interface and from the event producer of the event, a notification that an event identifier associated with the event in the event registration entry is no longer valid;
responsive to receiving the notification that the event identifier is no longer valid at the event management interface, blocking event notification for the event at the event management interface, whereby the transmitting of the event notifications to the event consumers is suspended;
further responsive to receiving the notification that the event identifier is no longer valid at the event management interface, dissociating the event identifier from the event registration entry, while maintaining the event registration entry;
second receiving, from the event producer, a new event identifier associated with the event;
responsive to second receiving the new event identifier, associating the registration entry with the new event identifier; and
responsive to associating the registration entry with the new event identifier, at the event management interface, resuming event notification for the event, whereby the transmitting of the event notifications to the event consumers is resumed.

16. The computer program product of claim 15, wherein the program instructions for implementing the event management interface, in response to the first receiving, perform the blocking and dissociating and return a cookie associated with the event registration entry to the event producer, wherein the event producer further provides the cookie with the new event identifier, whereby the program instructions for second receiving receive the cookie, and wherein the program instructions further comprise program instructions for locating the registration entry using the cookie and performing the associating in conformity with a result of the locating.

17. The computer program product of claim 15, wherein the event management interface is an interface of a file system that implements event notification in the computer system, wherein the event registration entry is a data structure providing a specifier of a file in the file system representing the event, and wherein the program instructions for maintaining retain the file in the file system and the specifier in the data structure while the file is not associated with the event identifier.

18. The computer program product of claim 17, wherein the program instructions for dissociating write an indication to the file that the event identifier has been dissociated, whereby an event consumer associated with the file is notified that the event identifier has been dissociated.

19. The computer program product of claim 18, wherein the program instructions for dissociating further write an indication of a particular action taken by the producer that caused removal of the event identifier.

20. The computer program product of claim 15, wherein the event is associated with a process, wherein the process is terminated causing the event identifier to become no longer valid, wherein a replacement process is spawned subsequent to termination of the process, and wherein the program instructions for second receiving receive the notification in response to spawning of the replacement process, wherein the process has a first process identifier wherein the replacement process has a second process identifier, and wherein the event identifier is the first process identifier and the new event identifier is the second process identifier.

* * * * *